July 23, 1968  S. J. MARKOWSKI  3,393,516

CURVED EXHAUST DEFLECTOR

Filed Dec. 5, 1966  5 Sheets-Sheet 1

INVENTOR
STANLEY J. MARKOWSKI
BY Charles A. Warren
ATTORNEY

July 23, 1968    S. J. MARKOWSKI    3,393,516
CURVED EXHAUST DEFLECTOR
Filed Dec. 5, 1966      5 Sheets-Sheet 3

FLOW THRU DEFLECTOR

FORCE BALANCE ON ELEMENTS OF DEFLECTED AIR

SECONDARY FLOW PATTERN OF OUTER LAYERS $F_C$ = CENTRIFUGAL FORCE, $\alpha \rho V^2$
$F_P$ = PRESSURE GRADIENT FORCE, $\alpha \dfrac{\partial P}{\partial R}$
$R$ = INSTANTANEOUS RADIUS OF CURVATURE OF ELEMENT $V_C$ = VELOCITY OF COOL FLOW
$V_H$ = VELOCITY OF HOT FLOW
$R$ = RADIUS
$F_P$ = PRESSURE GRADIENT FORCE ON ELEMENT
$F_{CH}$ = CENTRIFUGAL FORCE ON HOT ELEMENT, HIGH $P_T$
$F_{CC}$ = CENTRIFUGAL FORCE ON COOL ELEMENT, LOW $P_T$
$F_C{}'$ = CENTRIFUGAL FORCE ON BOUNDRY LAYER ELEMENT, VERY LOW $P_T$

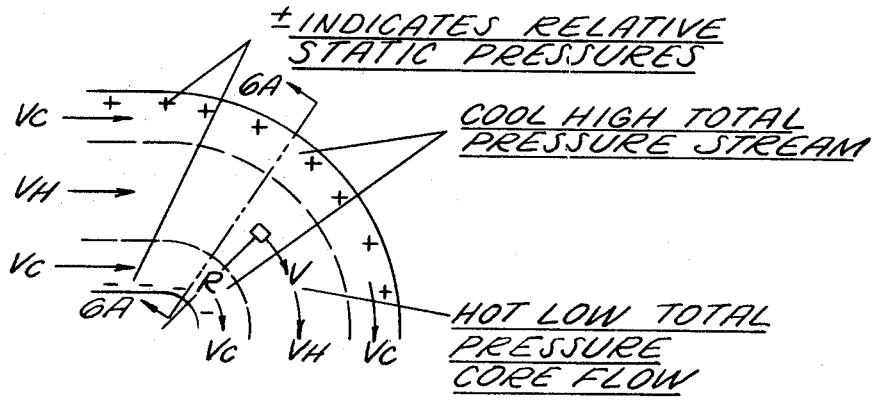

United States Patent Office 3,393,516
Patented July 23, 1968

3,393,516
CURVED EXHAUST DEFLECTOR
Stanley J. Markowski, East Hartford, Conn., assignor to United Aircraft Corporation, East Hartford, Conn., a corporation of Delaware
Filed Dec. 5, 1966, Ser. No. 599,996
9 Claims. (Cl. 60—204)

ABSTRACT OF THE DISCLOSURE

A curved exhaust deflector for use with an afterburning turbofan engine whereby the exhaust gases are prevented by bypass air from impinging upon the deflector wall as the gases are deflected from an axial flow direction to a downward flow direction.

---

This invention relates to an exhaust duct configuration for use in afterburning turbofan engines. More particularly, this invention relates to a curved exhaust deflector for deflecting a gas stream of an afterburning turbofan engine used for powering vertical takeoff and landing aircraft.

Normally in an afterburning engine an axial flow exhaust is employed. However, with the advent of vertical takeoff and landing aircraft, a requirement has arisen whereby the exhaust of the engine should be directed in a downward direction, at least during a portion of the flight regime. Several significant problems are encountered in deflecting a normally axial exhaust from a gas turbine in a downward direction, the most important of these being the requirement that the deflection system be compatible with an afterburning engine and its associated cooling and variable exhaust area problems. Further, the deflector should not comprise the forward thrust performance of the engine and the deflection system should also have the potential for a high thrust-to-weight ratio without undue frontal area penalties. To this extent then, it is an object of this invention to provide an arrangement for deflecting the exhaust stream of an afterburning turbofan engine.

In turbofan engines of the type employing afterburners, the temperature of the exhaust generally exceeds 2000° F. As a result of the normal Mach number match between the fan exhaust and the engine exhaust and because of the gas flow characteristics through a curved duct, the hot gases will normally impinge on the outer wall of the deflector at the bend and cause it to burn through. It is therefore a further object of this invention to provide an arrangement whereby a curved exhaust deflector can be used in an afterburning engine without the hot gases impinging on the outer wall of the deflector and causing a burn-through of the outer wall.

FIGURE 3a is a view substantially along line 3a—3a.

FIGURE 4a is a view substantially along line 4a—4a.

FIGURE 4b is a view substantially along line 4a—4a.

FIGURE 5a is a view substantially along line 5a—5a.

FIGURE 6 is a schematic showing secondary flows in deflecting compound flows.

FIGURE 6a is a view substantially along line 6a—6a.

In a conventional turbojet aircraft engine, air passes through an aligned compressor, burner section and turbine and is then discharged to atmosphere through an exhaust outlet thereby generating thrust. Typically, a turbofan engine adds the feature of taking a portion of engine air from an engine station such as the compressor and discharging it to atmosphere thereby generating additional thrust. For a more complete description of a turbofan engine, reference is hereby made to U.S. Patent No. 3,095,166, entitled "Ducted Fan Engine" by Thomas L. Briggs, Jr. and assigned to the assignee of the present invention.

Figure 2:
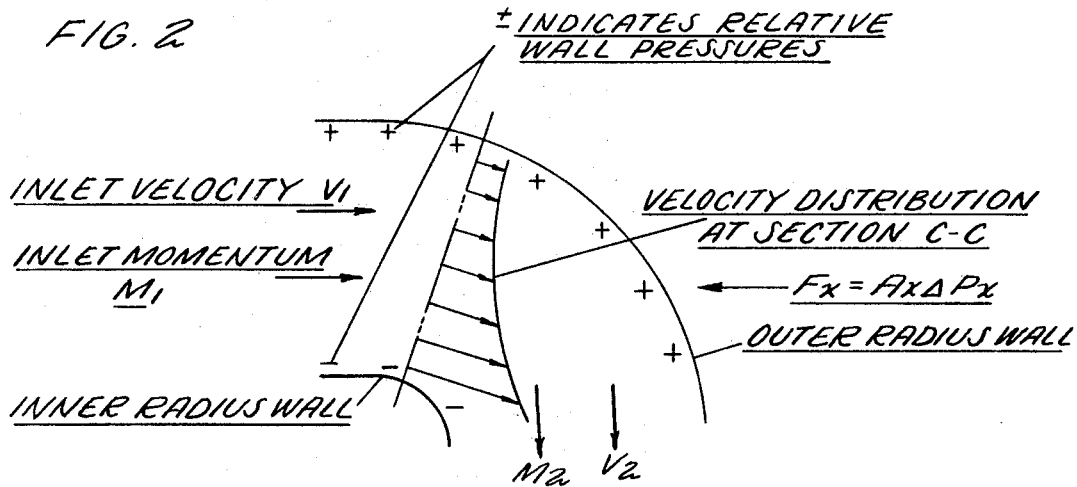
FIGURE 2 is a schematic showing aspects of primary flow through a curved duct.

Normally, in turbofan engines, to obtain supersonic speeds, an afterburner is used. This afterburner is usually formed in a straight or axial duct primarily because if curved, the flow of the exhaust gases impinges upon the duct causing it to burn out. This problem will be more readily understood by the following analysis. FIGURE 2 represents a diagram of the primary flow in a curved duct, the flow being full flow and going through a 90° deflection. Considering FIGURE 2 as a free body or more specifically consider a momentum envelope about the flow from the inlet plane to the exit plane, including the duct walls, it can be shown from Newton's laws that all the momentum, $Mx$ has been destroyed by a force $Fx$ which is equal to the projected area $Ax$ times some average static pressure $\Delta Px$, acting on the stream tube bounded by the momentum envelope. Similarly momentum $My$ was created, thus a force $Fy$ must exist equal to projected area $Ay$ times the average static pressure $\Delta Py$ across the stream tube. From these considerations it follows that the static pressure distribution is as shown in FIGURE 2, that is, the static pressure is relatively high along the outside radius and conversely low along the inside radius of the duct.

Figure 3:
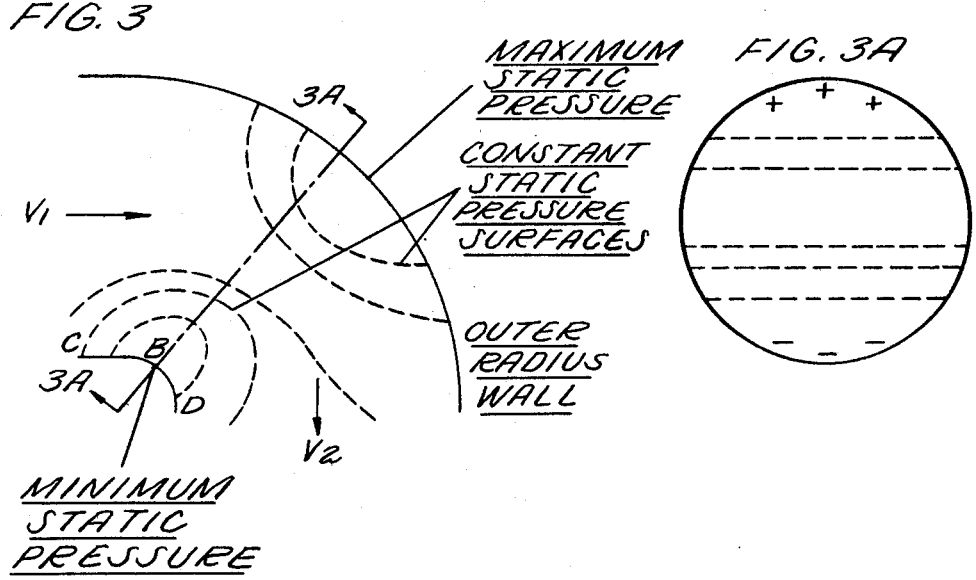
FIGURE 3 is a schematic showing aspects of primary flow static pressure surfaces.

FIGURE 3 shows the orientation of constant pressure surfaces of the primary flow without boundary layer. This distribution stems from the essentially two-dimensional nature of the flow. On this figure Point B on the inner contour C-D is a characteristic minimum static pressure for the system and Point E is a characteristic maximum static pressure.

Also, for uniform total pressure at the inlet to this deflector, the typical velocity distribution in a full flow curved duct is low along the outside and very high along the inner radius. As a result of this distribution, substantially more airflow occurs on the inner radius side of the curved duct than on the outer radius side as the flow is passing through the curved duct.

Figure 4:
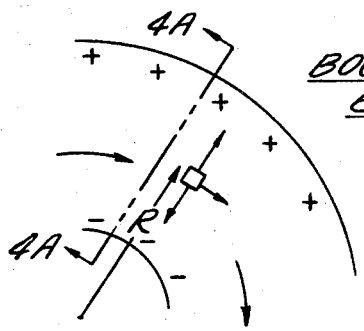
FIGURE 4 is a schematic showing secondary flow through a deflector.
Figure 4A:
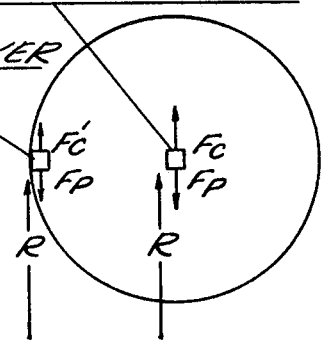
Figure 4B:
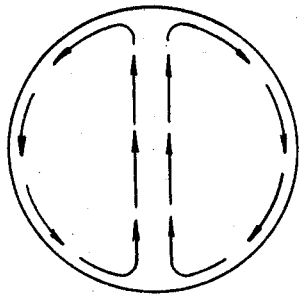

FIGURE 4 generally illustrates the generation of secondary flows in a curved duct due to low total pressure in the boundary layer along the sides of the duct. FIGURES 4, 4a and 4b teach that an element of air in the boundary layer is exposed to the same pressure gradient force as an element in the main stream but because the velocity is lower in the boundary layer, the magnitude of the centrifugal force ($Fc'$) on the element of air in the boundary layer is far smaller than on an element of air in the main stream ($Fc$). There results, therefore, a relative acceleration of the boundary layer to generate secondary flow currents shown pictorially in FIGURE 4b. The energy in this secondary flow builds up progressively as the flow proceeds through the curved duct. The net result downstream of the duct is a gross or entire duct mixing action. Another significant factor is that this secondary flow strips the boundary layer from the outer radius and sides of the duct and localizes this low energy air along the inside radius of the deflector.

Figure 5:
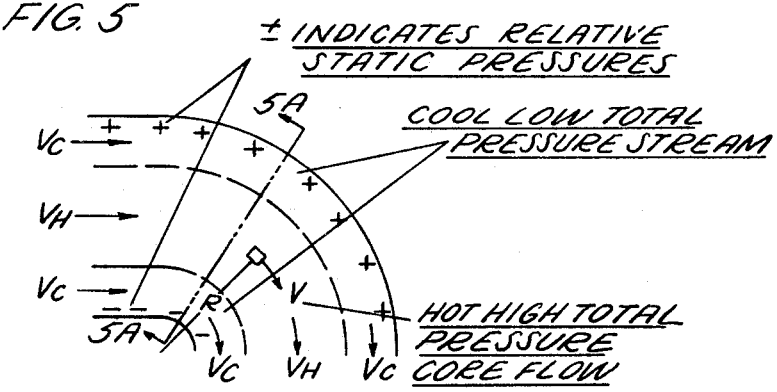
FIGURE 5 is a schematic showing secondary flows in deflecting compound flows.
Figure 5A:
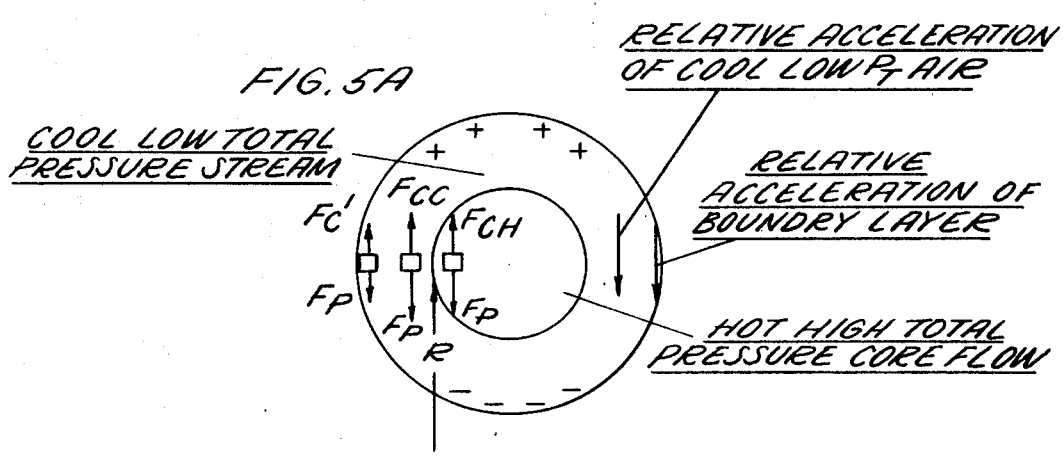

The flow in a turbofan engine consists of two distinctly different parallel layers of flow, plus the boundary layer along the walls. In deflecting such a compound flow, another characteristic of curved flow manifests itself. FIGURE 5 shows the essentials of the relative buoyancy-like forces in curved flow for a typical fan stream-engine stream match that is unfavorable for cooling, i.e. the total pressure of the fan air is low compared to the engine air. As in FIGURE 4, consider the forces on contiguous elements of air at the boundary between the engine air and the fan air. Both elements are exposed to the same static pressure and pressure gradient. Any difference in the balance of forces will result from the difference in centrifugal force on the elements which is proportional to the difference in local $\rho V^2$ of the respective elements. It can be readily shown, by reference to standard air tables, that the $\rho V^2$ of the hotter engine stream in FIGURE 5 is greater than the $\rho V^2$ of the cooler and lower total pressure of the adjacent fan air. The difference in $\rho V^2$ stems primarily from the differences in total pressure. The result of this element analysis shows that relative buoyancy-like forces will cause the fan stream to accelerate in a downward direction, as shown in section 5a, thereby producing large secondary flows.

Also in the configuration shown in FIGURE 5, the boundary layer will be accelerated downwards on both sides of the duct as well as the fan air. This, along with the downward currents of fan air will remove fan air from the outside wall and add air to the inside wall of the duct. In this manner, the cooling layer along the outer radius of the deflector is removed, exposing the reflector metal surface to the very hot core temperatures.

From the teaching contained in the foregoing paragraphs, it should be obvious why heretofore afterburners on turbofan or turbojet engines have been typically axial or straight ducts. One feature of this invention is, therefore, the use of a curved exhaust deflector with an afterburner. This is accomplished by maintaining a cool layer of insulating air along the outer wall of the deflector. This is done by matching the fan-engine total exhaust pressures upstream of the afterburner, thus benefiting the deflector cooling because with afterburning starting with an essentially uniform total pressure, the temperature profile type of burning will produce an inverse type of total pressure profile. That is, while the temperature is very hot in the core, the total pressure is lower due to the combustion-momentum total pressure loss.

More explicitly, FIGURE 6 illustrates the generation of secondary flows in the mainstream of a compound flow to foster deflector cooling while it is passing through a deflector. This is representative of a core-burning afterburner which provides a contoured temperature pattern to the deflector as well as a contoured total pressure pattern. Again considering the forces on adjacent elements of air in the cool-higher total pressure layer and the hot-lower total pressure afterburned core, it is seen that both adjacent elements are exposed to the same local static pressure and pressure gradient. Any difference in the balance of forces is, therefore, the result of differences in centrifugal force on the respective elements which is proportional to the difference in local $\rho V^2$ of the hot stream which is lower than the $\rho V^2$ of the cold stream. The local $\rho V^2$ of the respective elements are proportional to the respective local total pressures. The primary variable is, therefore, the local level of total pressure. This unbalance in centrifugal force, proportional to $\rho V^2$, will produce the buoyancy-like forces that generate local secondary currents as indicated in FIGURE 6a. More significantly, the relative direction of the secondary current generated in the cool layer of the mainstream is now opposite to that of the boundary layer-generated secondary flow. Hence, the net secondary flow is controlled to maintain or to reduce the dissipation rate of the cooling layers.

Figure 1:
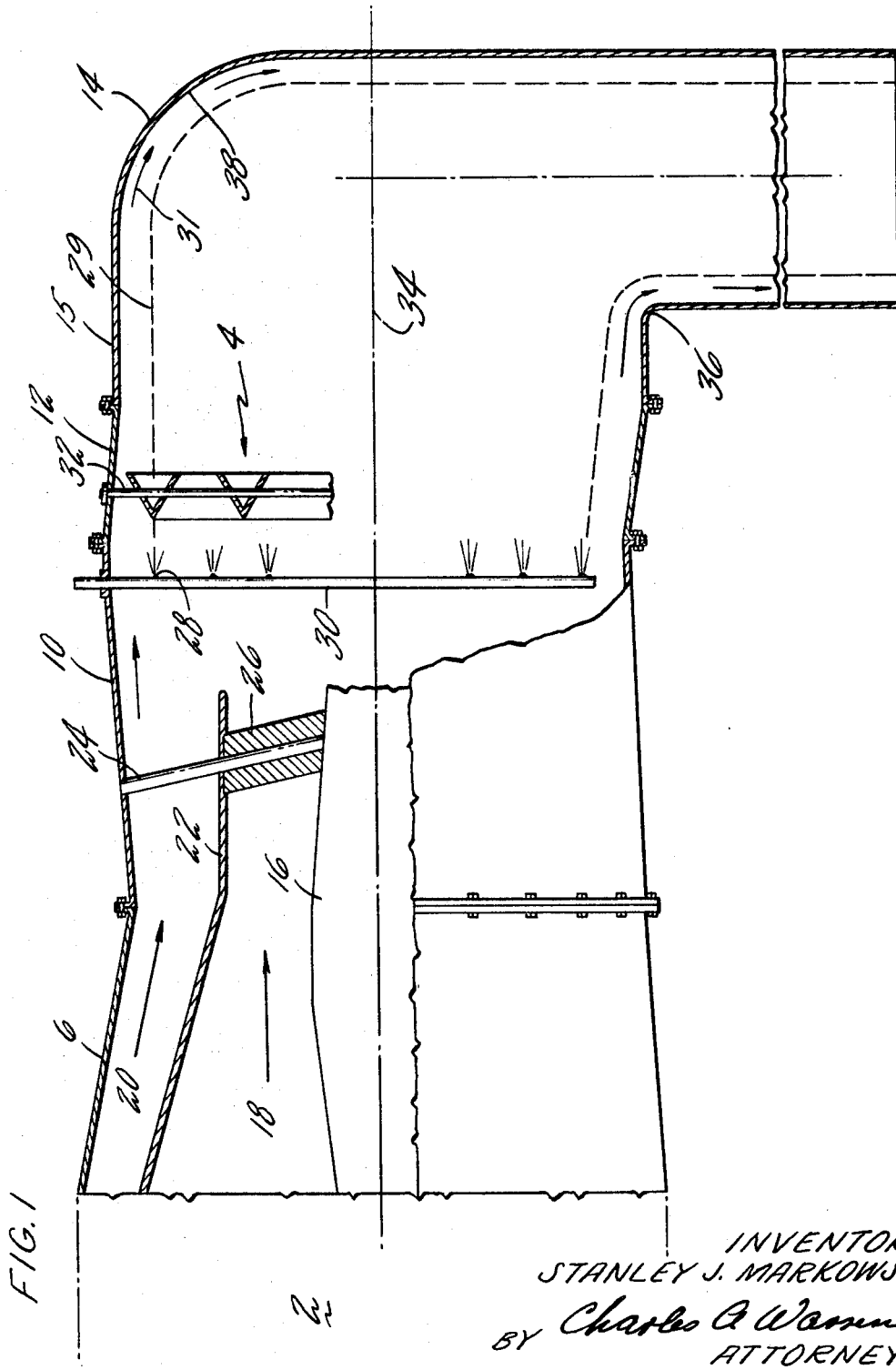
FIGURE 1 is a fragmentary side view showing a curved exhaust deflector and afterburner in its environment.

A particular embodiment of the invention herein described is contained in FIGURE 1. The numeral 2 indicates an engine generally having an afterburner 4 coaxially concentric with engine 2 and attached thereto by annular exhaust duct 6. Annular duct 6 comprises a diffuser section 10 and a combustion section 12. Connected to the downstream portion of the combustion section 12 is curved exhaust deflector 14. The curved exhaust deflector is connected to the combustion section 12 by a straight section 15 which is coaxial with combustion section 12. A bullet nose or inner body 16 is connected to the engine exhaust (not shown) and extends into the afterburner.

The engine exhaust stream 18 is separated from the fan exhaust stream 20 by splitter 22. Splitter 22 is annular in form and is supported by the engine exhaust (not shown) at one end and by strut 24, which extends between diffuser section 10 and inner body 16, at the opposite end. Positioned on strut 24 between splitter 22 and inner body 16 is vane 26. Vane 26 directs engine exhaust 18 onto and around fuel nozzles 28 contained within spray bar 30. Positioned downstream of fuel nozzles 28 are flame holders 32.

It is clear from FIGURE 1 that by matching the exit areas between splitter 22 and inner body 16 and splitter 22 and annular duct 6 that the total pressure of fan exhaust 20 and engine exhaust 18 can be made to be substantially identical. That is, upstream of fuel nozzles 28 the total pressure level across annular duct 6 is substantially the same.

Fuel nozzles 28 are positioned within combustion section 12 such that burning will occur only in a core or controlled profile 29. More explicitly, a portion of fan exhaust will not undergo combustion and will therefore form a peripheral stream 31 around the hot core or controlled profile 29 of combustion gases. This peripheral stream 31 will be cooler than, and have a higher total pressure than, the hot-core gases, the temperature of the core gases being higher because of the afterburning and the total pressure being lower as a result of a momentum drop caused by the burning. In the deflector proper there results, therefore, the generation of secondary flow currents in an upward direction, see FIGURES 6 and 6a, with the further result that the rate of dissipation of the boundary cooling layer is reduced.

It should be noted that the above combustion configuration is a symmetrical one, that is, the axis of fuel nozzles 28 is symmetrical with axis 34 of curved exhaust deflector 14. If difficulty is encountered in maintaining cooling boundary layer with this type of combustion configuration, an asymmetrical combustion configuration can be employed. In this type of configuration, the afterburner fuel spray is adjusted by moving fuel nozzles 28 radially towards inner wall 36 of curved exhaust deflector 14. Therefore, the axis of fuel nozzles 28 is no longer symmetrical with axis 34 of curved exhaust deflector 14, it being offset in a direction away from outer wall 38 of curved exhaust deflector 14. This results in a coreburning profile that permits a larger entering sector of cool fan exhaust 18 and hence the rate of dissipation of the cooling boundary layer is further reduced.

It is to be understood that the invention is not limited to the specific description above or to specific figures shown, but may be used in other ways without departure from its spirit as defined by the following claims.

I claim:
1. In a turbofan engine including an afterburner having an annular duct which surrounds the fan exhaust and the engine exhaust, a plurality of fuel nozzles supported in said annular duct, and a curved exhaust deflector located downstream of said afterburner, the method of maintaining a cooling boundary layer in said curved exhaust deflector comprising the steps of:

matching the fan exhaust total pressure and the engine exhaust total pressure forwardly of said fuel nozzles so that the total pressure level across said duct forwardly of said fuel nozzles is substantially uniform; and afterburning in a controlled profile, the controlled profile comprising a hot core of combustion gases radially spaced from the outer wall of said curved deflector and a peripheral stream of unburned gases therearound, the total pressure of said peripheral stream being greater than the total pressure of said hot core thereby lowering the rate of dissipation of said cooling boundary layer along said outer wall as said hot core and peripheral stream pass through said curved deflector.

2. A method of recited in claim 1 wherein:

the afterburning in said controlled profile is done symmetrically with the axis of said curved exhaust deflector.

3. A method of recited in claim 1 wherein:

the afterburning in said controlled profile is done asymmetrically with the axis of said curved exhaust deflector, the axis of said controlled profile being offset in the direction of the inner wall of said curved exhaust deflector.

4. An afterburning turbofan engine with a curved exhaust deflector comprising:

an annular duct enclosing the engine exhaust and the fan exhaust;

a curved exhaust deflector attached to said annular duct;

a plurality of fuel nozzles, said nozzles being positioned within said annular duct and supported therefrom, said fuel nozzles being radially spaced from the outer wall of said duct so that combustion does not occur in the outer peripheral gas stream; and a flow splitter supported in said annular duct, said splitter separating said fan exhaust and said engine exhaust, said splitter being located forwardly of said fuel nozzles and spaced axially therefrom, the radial position of the trailing edges of said splitter being located such that the level of the fan exhaust total pressure and the engine exhaust total pressure is substantially the same forward of said fuel nozzles.

5. A construction as in claim 4 including:

means for positioning said fuel nozzles so that the center line of said fuel nozzles is eccentric with respect to the axis of said curved exhaust deflector in the direction of the inner wall of said curved exhaust deflector.

6. A construction as in claim 4 including:

means for positioning said fuel nozzles so that the center line of said fuel nozzles is coannular with respect to the axis of said curved exhaust deflector.

7. The combination with a turbofan engine, an afterburner having an annular duct and fuel nozzles therein, a curved exhaust deflector attached to said annular duct, and a flow splitter located within the engine exhaust and upstream of said afterburner:

means for locating the radial position of the trailing edges of said splitter such that the total pressure level of the engine exhaust and the fan exhaust forwardly of said fuel nozzles is substantially uniform; and means for positioning said fuel nozzles within said afterburner rearwardly of said flow splitter, said fuel nozzles being radially spaced from the outer wall of said annular duct thereby insuring that no afterburning occurs in the stream passing adjacent said outer wall.

8. In a combination as recited in claim 7 wherein:

said fuel nozzles are positioned so that the center line of said fuel nozzles is coannular with the axis of said curved exhaust deflector.

9. In a combination as recited in claim 7 wherein:

said fuel nozzles are positioned so that the center line of said fuel nozzles is eccentric with the axis of said curved exhaust deflector, said means causing the eccentricity to be in the direction of the inner wall of said curved exhaust deflector.

References Cited

UNITED STATES PATENTS

| | | | |
|---|---|---|---|
| 3,100,627 | 8/1963 | Wilde | 60—261 |
| 3,163,982 | 1/1965 | Rice | 60—261 |
| 3,178,887 | 4/1965 | Wilde | 60—232 |
| 3,327,480 | 6/1967 | Gunter | 60—261 |

MARTIN P. SCHWADRON, *Primary Examiner.*

DOUGLAS HART, *Assistant Examiner.*